United States Patent
Dai

(10) Patent No.: US 6,944,017 B2
(45) Date of Patent: Sep. 13, 2005

(54) DUAL FUNCTION ELECTRONIC DISPLAY SCREEN

(75) Inventor: Xia Dai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 09/752,049

(22) Filed: Dec. 28, 2000

(65) Prior Publication Data

US 2002/0085348 A1 Jul. 4, 2002

(51) Int. Cl.$^7$ ............................................ G06F 1/16
(52) U.S. Cl. ................................ 361/686; 361/683
(58) Field of Search ............................... 361/679–686

(56) References Cited

U.S. PATENT DOCUMENTS

| | | | | |
|---|---|---|---|---|
| 5,440,502 A | * | 8/1995 | Register ................. | 364/708.1 |
| 5,825,617 A | * | 10/1998 | Kochis et al. ............ | 361/686 |
| 5,850,209 A | * | 12/1998 | Lemke et al. ............ | 345/156 |
| 5,933,609 A | * | 8/1999 | Walker et al. ............ | 710/304 |
| 6,065,124 A | * | 5/2000 | Lee ........................ | 713/323 |
| 6,285,911 B1 | * | 9/2001 | Watts et al. .............. | 700/2 |
| 6,359,777 B1 | * | 3/2002 | Newman et al. .......... | 361/683 |
| 6,393,573 B1 | * | 5/2002 | Gillespie ................. | 713/324 |

* cited by examiner

Primary Examiner—Yean-Hsi Chang
(74) Attorney, Agent, or Firm—Blakely, Sokoloff, Taylor & Zafman LLP

(57) ABSTRACT

A computer display screen that functions as an information processing device such as a PALM, PIN or PDA when detached from the computer is disclosed.

12 Claims, 4 Drawing Sheets

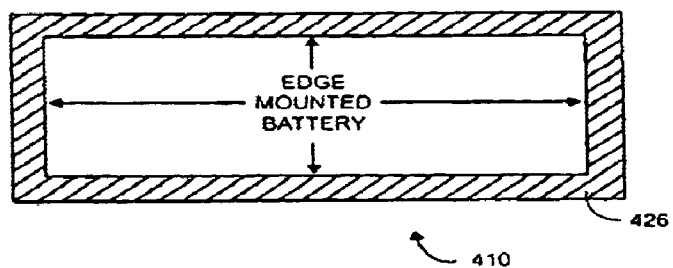
FIG. 4A
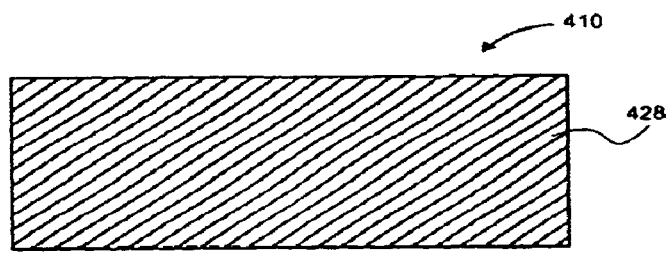
FIG. 4B
FIG. 5
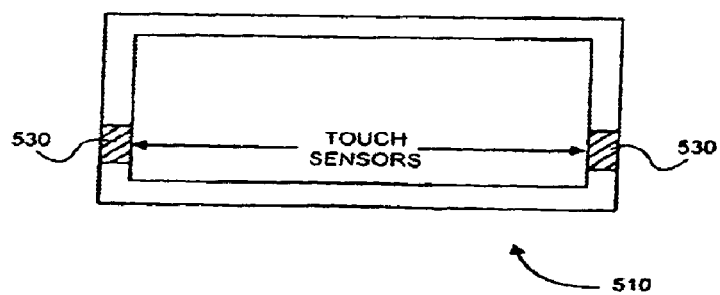

DUAL FUNCTION ELECTRONIC DISPLAY SCREEN

BACKGROUND OF THE INVENTION

Notebook computers are very popular because they are light, compact and ease to carry. Most notebook computers can fit inside a briefcase. A key feature of the notebook computers is that rechargeable batteries can power them for a reasonable period of time. A notebook computer typically comprises a display screen and a base. They perform different functions and both are indispensable to the user of the notebook computer.

The display screen is also referred to as the monitor. It is used to display information to the user. The display screen typically works under the same principle as a television, using a cathode ray tube (CRT). Modern display screens are typically lightweight and non-bulky because of technologies such as the flat-panel technologies.

The base of the notebook computer generally includes the processor, the memory, and the keyboard. Modern base components typically include processors, memory capacity, and disk drives similar to desktop computers.

Either an external source or a battery can power the notebook computer. When the user is in his office, he has access to an unlimited external power source such as an AC outlet. In this scenario, the notebook computer typically operates in the high performance mode and enjoys the full benefits of the powerful system provided by the base. When the user moves around the corporate buildings and conference rooms, for example, to attend meetings, the notebook computer uses the battery as the power source. That allows the user the flexibility to use the notebook computer in the places where he may not have access to an AC outlet. In this scenario, because the battery life is finite, the notebook computer typically operates in the low power mode to extend the battery life. By operating the notebook computer in the low power mode, the user is able to use it for a longer time but he sacrifices some of the benefits of the powerful system provided by the base such as the maximum computing speed.

In the home environment, the user may wish to use the notebook computer mainly for Internet browsing or document reading. In this scenario, the user has no use for the most components of the powerful system provided by the base. Thus, the user unnecessarily carries the entire notebook computer home. Also, the idle base components are unnecessarily consuming power when the notebook computer is powered on.

These issues are not addressed by the current technology including the high performance and low power operations options. The user does have the option to purchase a palm computer (PALM) such that he won't have to carry the heavier and bulkier notebook computer. The user may not wish to purchase a PALM in addition to his notebook computer, however, and also, he may prefer the larger screen size of the notebook computer to the small PALM screen. There is a need in the art, therefore, to enhance the usage of notebook computers with respect to battery life, weight and ease of use.

BRIEF DESCRIPTION OF THE DRAWINGS

The present invention is illustrated by way of example and not limitation in the figures of the accompanying drawings, in which like references indicate similar elements and in which:

FIGS. 4 & 4b illustrate two embodiments of the screenpads including the batteries.

FIG. 5 illustrates one embodiment of the screenpad including a touch-on feature.

DETAILED DESCRIPTION

The present invention discloses an electronic display screen that functions in dual modes: as a typical electronic display screen of an information processing device when docked to a base and as an information processing device when detached from the base. The examples of the information processing devices include palm computers (PALM), personal digital assistants (PDA), desktop computers and notebook computers. In one embodiment, when detached from the base, the electronic display screen offers information processing functions. In the ensuing description, the detached electronic display screen in the information processing mode is referred to as the screenpad. The electronic display screen can be synchronized with the base before it is detached by using methods such as hot synchronization. The screenpad can access the resources on the on the base through wireless technologies through the networks such as the Internet and the intranets. In one embodiment, the screenpad weighs less than two pounds. In one embodiment, the screenpad can operate on less than 2.5 watts (W) of power and can operate on a three-cell 20 watt-hours (Wh) battery for eight hours before the battery needs to be recharged.

In the ensuing description, the present invention is described with reference to a notebook computer. It will be obvious that the notebook computer is discussed by way of example and that the present invention is applicable to all information processing devices.

Figure 1:
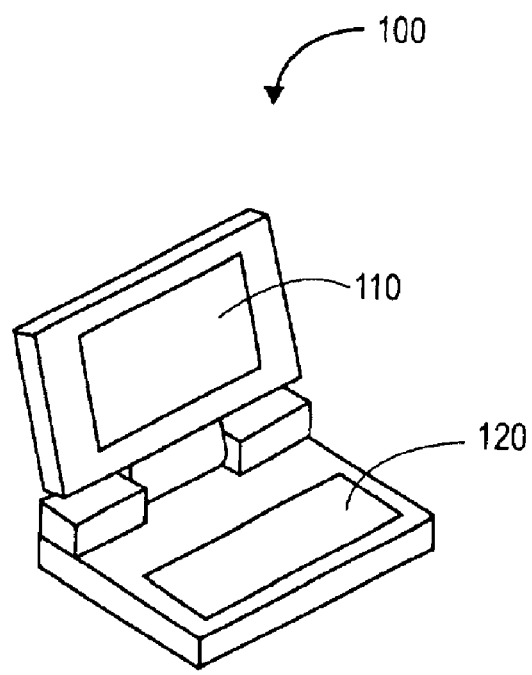
FIG. 1 illustrates one embodiment of the notebook computer.

FIG. 1 illustrates one embodiment of the notebook computer. The notebook computer 100 is shown comprising the electronic display screen 110 docked to the base 120. In another embodiment, the electronic display screen 110 is docked to the desktop computer 120. In one embodiment, the electronic display screen 110 can be detached from the base 120. In one embodiment, when docked to the base 120, the electronic display screen 110 functions as an electronic display screen on which the images appear. In one embodiment, when detached from the base 120, the screenpad 110 functions as the information processing device such as, for example, an electronic tablet.

In one embodiment, screenpad 110 communicates with the base 120 through wireless technology such as the bluetooth technology (BT) or the infrared (IR) technology. In one embodiment, the screenpad 110 acts as the client and the base 120 acts as the server.

In one embodiment, the screenpad 110 and the base 120 are BT-enabled devices. In one embodiment, the BT uses radiotelephony to connect a wide range of computing and telecommunication devices. The screenpad 110 and the base 120 can communicate through a point-to-point radio channel. This arrangement between the screenpad 110 and the base 120 forms a piconet. The BT-enabled devices are embedded with tiny short-range transceivers. The transceivers are embedded directly or through an adapter device.

In an alternate embodiment, the screenpad 110 can be docked to a different base than the base 120. In one embodiment, the screenpad 110 can be docked to a desktop computer. In an alternate embodiment, the screenpad 110 can interface with a base different from the base 120 through the BT and IR technologies.

In one embodiment, the base 120 includes a processor, chipsets, a random access memory (RAM), a hard disk drive (HDD), a compact disk read only memory (CD-ROM) drive, a digital video disk (DVD) drive, a keyboard, a modem, a battery, and a voltage regulator. The components of the screenpad 110 are described below with reference to FIG. 2.

In the ensuing description, the system and operation of the screenpad 110 are described in detail with references to FIGS. 2–5. As stated before, screenpad 110 refers to the detached electronic display screen 110 operating in the information processing mode.

Figure 2:
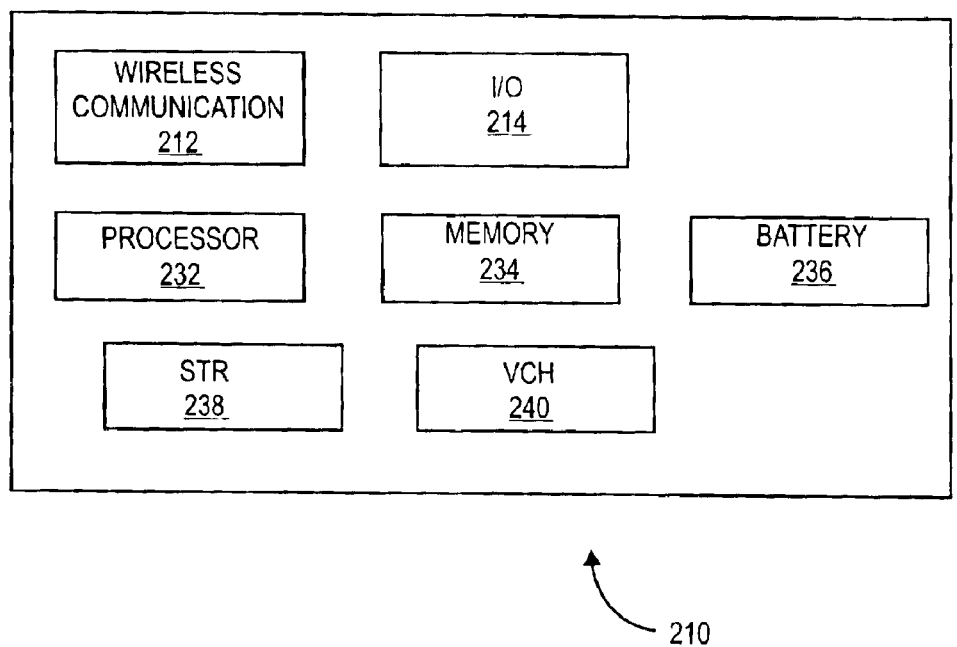
FIG. 2 illustrates a system block diagram for one embodiment of the screenpad.

FIG. 2 illustrates the system block diagram for one embodiment of the screenpad. The screenpad 210 is shown including a wireless communication feature 212, an input/output (I/O) 214, a processor 232, a memory 234, a battery 236, a suspend-to-RAM (STR) feature 238, and a video control hub (VCH) 240. In one embodiment, the wireless communication feature 212 includes a wireless local area network (WLAN) feature. In an alternate embodiment, the wireless communication feature 212 includes a BT feature. In an alternate embodiment, the screenpad includes the WLAN feature 212 and the BT feature 212.

In an alternate embodiment, the screenpad 210 includes a system on chip (SOC). In an alternate embodiment, the screenpad 210 includes a micro drive. In an alternate embodiment, the screenpad 210 includes a voltage regulator.

In one embodiment, the WLAN feature 212 facilitates on campus communications including accessing data and devices anywhere on the local area network (LAN) of which the base 120 is a node. In one embodiment, the LAN is confined to the user's office building. In one embodiment, the LAN is connected to other LANs over any distance via telephone lines and radio waves. In one embodiment, the I/O 214 is interfaces the display screen 210 with the keyboard and the universal serial bus (USB). In one embodiment, the keyboard is a wired keyboard.

In one embodiment, the screenpad processor 232 and the screenpad chipsets are integrated. In one embodiment, the chipsets include the video control hub (VCH) 240 and the memory control hub (MCH). In one embodiment, the integrated processor 232 and chipsets system form the system on chip (SOC). In an alternate embodiment, the SOC includes the accelerated graphics port (AGP). In an alternate embodiment, the SOC includes memory such as the cache memory. The key advantages of SOC over the non-integrated processor and chipsets shown in FIG. 2 are the efficiencies in cost and function. For example, in one embodiment, the SOC requires less than 1.0 watt of power to operate.

In one embodiment, the BT feature 212 facilitates the interface between the screenpad 210 and the base 120 such that the base resources can be accessed through the screenpad 210. In another embodiment, an IR feature facilitates the interface between the screenpad 210 and the base 120 such that base resources can be accessed through the screenpad 210. In yet another embodiment, the screenpad 210 is can access the base 120 resources through the networks such as the Internet and the WLAN. In one embodiment, the screenpad 210 receives inputs from a wireless BT-enabled keyboard. In another embodiment, the screenpad 210 receives inputs from a wireless IR keyboard. In one embodiment, the screenpad 210 is can access networks such as the Internet and the intranets through the wireless links such as the BT links and the WLAN.

In one embodiment, the STR feature 238 facilitates an always-on, always-connected usage model for the screenpad 210. In one embodiment, when the display screen 210 is docked to the base 120, the display screen 210 is placed in the low power STR state such that most display screen 210 components including the processor can be turned off. In one embodiment, the screenpad 210 can dynamically switch from the display screen mode to the computer mode when the screenpad 210 is detached from the base 120. Dynamic switching refers to the automatic switching between the modes without rebooting. In one embodiment, the screenpad 210 switches modes in less than 3 seconds after the detachment from the base 120. In one embodiment, the memory 234 facilitates the dynamic mode switching by storing key information in its registers such as the screenpad system configuration information.

In one embodiment, the user can manually synchronize the screenpad 210 with the base 120 before detaching the screenpad 210 from the base 120. In one embodiment, the base keyboard includes a hot button key that can synchronize the screenpad 210 to the base 120. In one embodiment, the user can press the hot button key before detaching the screenpad 210 such that the users e-mails and recently accessed files are stored in the memory 234 or the micro-disk drive.

In one embodiment, the screenpad 210 provides point and press usage and scribble usage including graffiti. In one embodiment, the screenpad 210 functions as a palm computer (PALM). In one embodiment, the screenpad 210 functions as a digital tablet. In one embodiment, the screenpad 210 functions as a personal digital assistant (PDA). In one embodiment, the screenpad 210 functions as a personal information manager (PIM). In one embodiment, the screenpad 210 functions as a Web Pad. In one embodiment, the screenpad 210 functions as a pad personal computer (pad PC).

In one embodiment, the screenpad 210 includes an operating system. In one embodiment, the operating system is a version of the Windows operating system provided by the Microsoft Corporation, located in Redmond, Wash., such as the Windows CE operating system. In one embodiment, a version of the Office Suits software, also provided by the Microsoft Corporation, is installed on the display screen 210. In one embodiment, the VCH 240 functions as the screenpad driver. In one embodiment, the screenpad processor and the base processor share the VCH 240. In one embodiment, the VCH chip is located situated inside the screenpad 210.

In one embodiment, the memory 234 has the size of 128 mega bytes (MB) and requires less that 0.1 watt to operate. In an alternate embodiment, the memory 234 requires less than 0.5 watts to operate. In one embodiment, the screenpad hard-disk-drive (HDD) has the same memory capacity as the base HDD including 20 giga bytes (GB). In one embodiment, the micro drive requires less than 0.2 watts to operate. In an alternate embodiment, the micro drive requires less than 0.5 watt to operate. In one embodiment, the VCH 240 requires less than 0.2 watt to operate. In an alternate embodiment, the VCH 240 requires less than 0.5 watt to operate.

Figure 3:
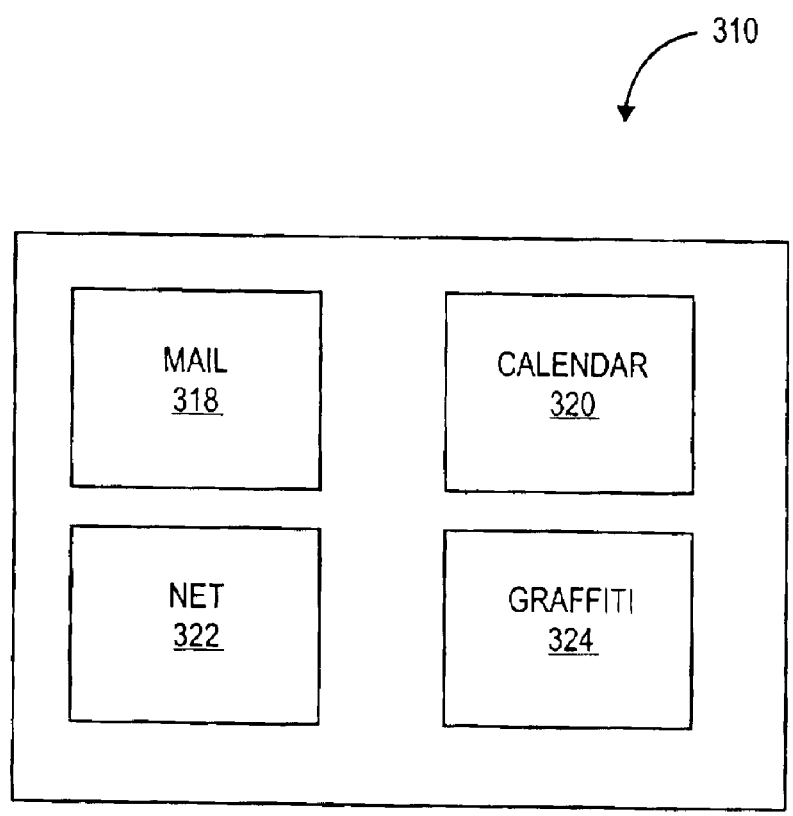
FIG. 3 illustrates a block diagram for one embodiment of the services offered by the screenpad.

FIG. 3 illustrates a block diagram for one embodiment of the services offered by the screenpad. The screenpad 310 is shown offering the user with services such as receiving, sending and reading the e-mails 318, reading and amending the calendar 320, connecting to the networks 322 such as the Internet or intranets, and composing graffiti 324.

FIGS. 4*a* & 4*b* illustrate two embodiments of the screenpads including the batteries. The battery 426 or 428 should be mounted on the screenpad 410 intelligently such that the form factor is minimized. In one embodiment, as illustrated in FIG. 4*a*, the battery 426 is edge mounted, i.e., around the perimeter of the screenpad 410. In another embodiment, as illustrated in FIG. 4*b*, the battery 428 is back mounted. In one embodiment, the battery 426 or 428 is an integral part of the screenpad 410. In one embodiment, the total battery weight is 0.7 pounds. In the alternate embodiments, the battery weight varies. In one embodiment, the battery 426 or 428 includes a 32 watt-hours (Wh) battery. In another embodiment, the battery 426 or 428 includes a 3-cells 20 Wh battery. In one embodiment, the 3-cells 20 Wh battery 426 or 428 can power the screenpad 410 for 8 hours without a recharge. In the alternate embodiments, the battery lifetime varies.

FIG. 5 illustrates one embodiment of the screenpad including a touch-on feature. The screenpad 510 is shown comprising the touch sensors 530. In one embodiment, the screenpad 510 is powered on when pressure is applied to the sensor 530 and the screenpad 510 is powered off when the pressure is not applied to the sensor 530. An advantage of the touch-on feature is that the battery life is extended because the screenpad 510 is automatically powered off when the user is not using the screenpad 510. In one embodiment, the screenpad 510 powers off if no pressure is applied to the sensor 530 for a predetermined period of time. In another embodiment, the screenpad 510 does not include the touch-on feature. In yet another embodiment, the user can select either the normal mode or the touch-on mode for the operation of the screenpad 510. In one embodiment, the screenpad 210 comprising the touch-on feature can reduce the required average display power to display images to less than 1 watt. In one embodiment, the total power required to operate the screenpad 510 is less than 2.5 watts. In an alternate embodiment, the total power required to operate the screenpad 510 is less than 4.0 watts.

The invention has been described in conjunction with the preferred embodiment. It is evident that numerous alternatives, modifications, variations and uses will be apparent to those skilled in the art in light of the foregoing description.

What is claimed is:

1. A detachable electronic display screen of a notebook computer comprising;
   a processor and a suspend-to-RAM (STR) unit, the electronic display screen to function as an electronic display screen when coupled to a base of the notebook computer and to function as an information processing device when detached from the base of the notebook computer, the STR unit to dynamically transition the electronic display between a low power display mode when docked to the base and a higher power computer mode when detached from the base, the base including a processor, a random access memory, and a hard disk drive.

2. The electronic display screen of claim 1, wherein the information processing mode further includes operations is selected from a group consisting of a palm computer (PALM), a personal digital assistant (PDA), and a personal information manager (PIM).

3. The electronic display screen of claim 1, further comprising:
   electronic display screen components are selected from the group consisting of a processor, a chipset, a voltage regulator, a memory, a screen, a battery, and an operating system.

4. The electronic display screen of claim 1, further comprising:
   a battery is mounted on an edge of the display screen.

5. The electronic display screen of claim 1, further comprising:
   a battery is mounted on a back of the display screen.

6. The electronic display screen of claim 1, further comprising:
   the electronic display screen is synchronized with the base prior to the display screen is detached from the base.

7. The electronic display screen of claim 1, further comprising:
   the electronic display screen can access base resources through a wireless link when the electronic display screen is detached from the base.

8. The electronic display screen of claim 1, further comprising:
   the electronic display screen can receive a point and press input and a scribble input.

9. A notebook computer comprising:
   a processor;
   a random access memory;
   a hard disk drive;
   a detachable electronic display screen, including a processor and a suspend-to-RAM (STR) unit, the display screen to operate in an information processing mode when detached from the notebook computer, the STR unit to dynamically transition the display between a low power display mode when docked to the computer and a higher power computer mode when detached from the notebook computer.

10. The notebook computer of claim 9, wherein the electronic display screen can access resources of the computer through a wireless link when the electronic display screen is in the information processing mode.

11. The notebook computer of claim 9, wherein the information processing mode further includes operations is selected from a group consisting of a palm computer (PALM), a personal digital assistant (PDA), and a personal information manager (PIM).

12. The notebook computer of claim 9, further comprising:
   the electronic display screen components are selected from the group consisting of a processor, a chipset, a voltage regulator, a memory, a micro drive, a screen, a battery, and an operating system.

* * * * *